(12) United States Patent  
Simon

(10) Patent No.: US 6,607,039 B2
(45) Date of Patent: Aug. 19, 2003

(54) CORE PROCESSOR

(75) Inventor: Shane D. Simon, Cascade, IA (US)

(73) Assignee: American-Iowa Mfg. Inc., Cascade, IA (US)

( * ) Notice: Subject to any disclaimer, the term of this patent is extended or adjusted under 35 U.S.C. 154(b) by 19 days.

(21) Appl. No.: 09/974,120

(22) Filed: Oct. 8, 2001

(65) Prior Publication Data

US 2003/0066661 A1 Apr. 10, 2003

(51) Int. Cl.⁷ .............................................. A01B 45/02
(52) U.S. Cl. ................................. 172/22; 241/101.763
(58) Field of Search ........................... 172/21, 22, 33, 172/32; 414/502, 503, 501, 486; 241/101.763, 186.4; 56/16.4 R, 228

(56) References Cited

U.S. PATENT DOCUMENTS

| | | |
|---|---|---|
| 3,790,986 A | 2/1974 | Burger |
| 3,868,063 A | 2/1975 | Slaker |
| 3,945,176 A | 3/1976 | Vicendese et al. |
| 4,148,362 A * | 4/1979 | Orth .............................. 172/22 |
| D297,779 S | 9/1988 | Linde |
| 5,002,453 A * | 3/1991 | Shigehisa ................... 414/502 |
| 5,069,293 A * | 12/1991 | St. Romain ................... 172/22 |
| 5,142,852 A | 9/1992 | Nelson |
| 5,178,221 A | 1/1993 | Hamawaki et al. |
| 5,375,399 A | 12/1994 | Kraft |
| 5,423,386 A | 6/1995 | Lapearous |
| 5,577,375 A | 11/1996 | Tillison, Sr. |
| 5,816,336 A * | 10/1998 | Underhill ...................... 172/22 |
| 5,983,560 A | 11/1999 | Hartmeister |
| 6,098,387 A | 8/2000 | Pfisterer |
| 6,142,239 A * | 11/2000 | Underhill ...................... 172/22 |
| 6,142,240 A * | 11/2000 | Underhill ...................... 172/22 |
| 6,192,991 B1 | 2/2001 | Seliga et al. |
| 6,253,858 B1 * | 7/2001 | Warke .......................... 172/22 |
| 6,321,849 B1 * | 11/2001 | Underhill ...................... 172/22 |

* cited by examiner

Primary Examiner—Victor Batson

(57) ABSTRACT

A core processing device with a housing having forward and rearward ends, opposite sidewalls, a top, and an open bottom. Wheels operatively connected to the housing. A rotatable brush member connected to the sidewalls for picking up and transporting cores. A shredding member for receiving, shattering, and depositing cores. And a power means for driving the brush member and shredding member.

24 Claims, 5 Drawing Sheets

CORE PROCESSOR

BACKGROUND OF THE INVENTION

The present invention is directed to a core processing device and more particularly, a core processing device used for golf course maintenance and commercial lawn care.

To facilitate turf growth, aerator machines are used to relieve turf compaction and thatch build up. The machines aerate the turf by punching holes in the turf, which create sod plugs, also known as sod cores. The sod cores are generally cylindrical and comprise a layer of grass, a tightly woven layer of thatch, and a layer of roots and soil including rocks, sand, and clay. The thatch layer, which includes both living and dead matter, grows in an outwardly expanding layer above the soil, which significantly deters growth thus necessitating removal. In contrast, the soil and root layer is often composed of valuable topsoil or sand, which is removed from the turf, and it is desirable to recycle the dirt back into the turf.

Traditionally, the sod cores are either left in place to deteriorate naturally, collected by either manual or powered sweeping, or broken apart either by dragging a metal mat over the sod cores or shattering them with a flail style mower. Each of these methods have undesirable attributes. When cores are left in place to deteriorate naturally, they are both unsightly and, when used to facilitate turf growth on a golf course, interfere with play. When cores are collected by either manual or powered sweeping, there are other drawbacks. Manual sweeping requires additional manpower, time, and expense, while both means of sweeping do not separate the soil from the thatch to allow recycling of the soil back into the turf. Dragging can break the cores apart allowing soil to be returned to the core holes, but continues to be a process that is time consuming in that it requires multiple passes to breakup the cores and also causes scuffing, tearing and additional damage to the turf such as compaction. Finally, flail mowers, while breaking the cores up tend to severely scalp or destroy the turf all together in mounded or un-level sections of the ground.

Therefore, the principal object of this invention is to provide a core processor that can shatter cores while minimizing or eliminating damage to the turf.

A further object of this invention is to provide a core processor that takes less time to shatter or recycle the cores after the aerification process.

BRIEF SUMMARY OF THE INVENTION

The core processor of this invention has a housing with a forward and rearward end, opposite sidewalls, a top and an open bottom. Operatively connected to the sidewalls of the housing are wheels for transporting and operating the core processor. A rotatable brush member extends longitudinally through the sidewalls of the housing and is positioned to engage the ground through the open bottom for picking up and transporting cores. A rotatable shredding member also extends longitudinally through the sidewalls of the housing and is positioned to receive cores thrown by the brush member on a surface of the shredding member to shatter the cores and deposit the shattered cores on the ground through the open bottom. The brush member and shredding member are drivingly connected to a power means for rotating the brush member and the shredding member. In operation, the brush member picks up cores from the ground, transports the cores into the housing, and throws the cores onto the shredding member where the cores are shattered and deposited on the ground.

DETAILED DESCRIPTION OF THE INVENTION

Figure 1:
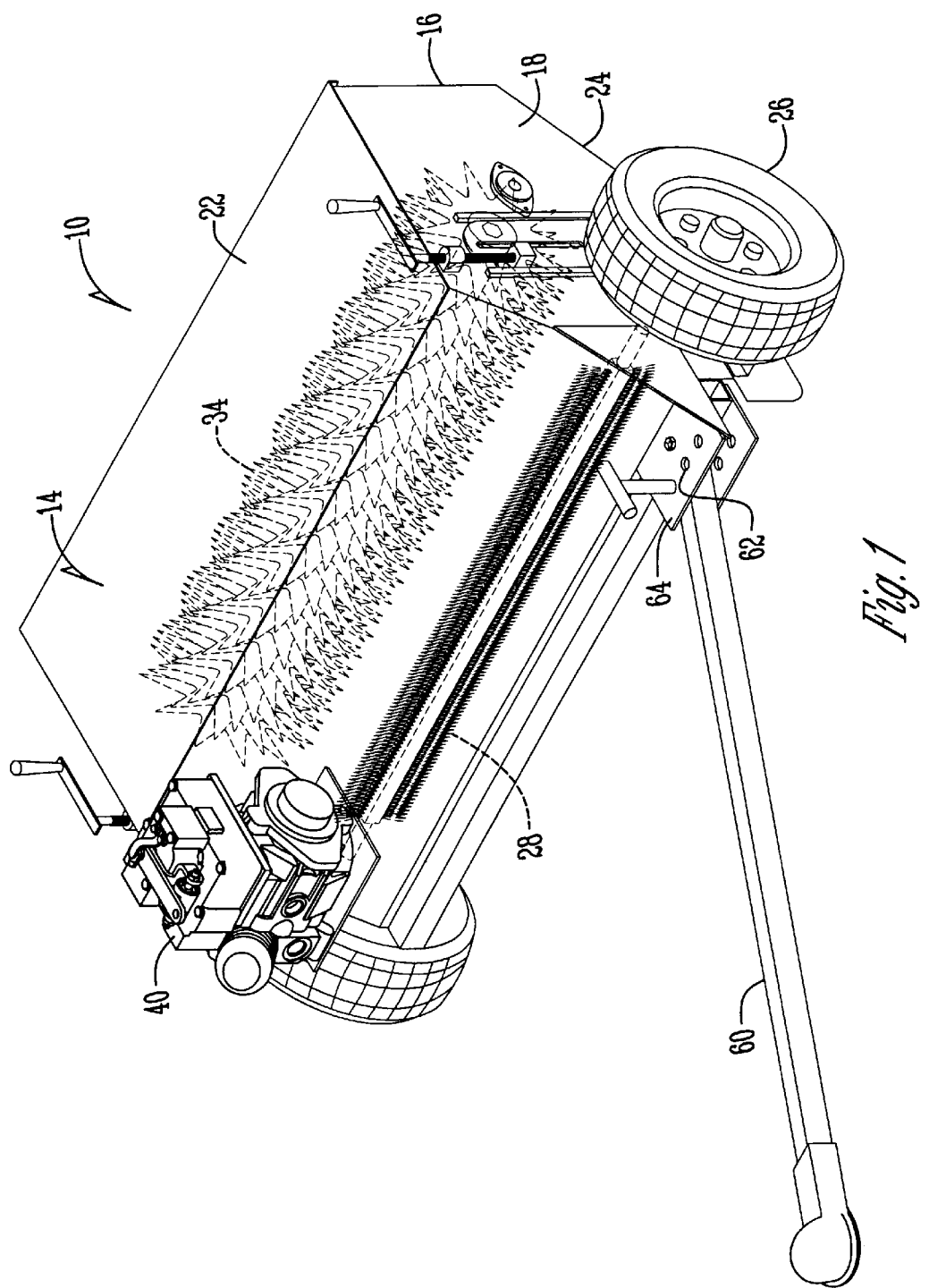
FIG. 1 is a perspective view of the core processor.
Figure 2:
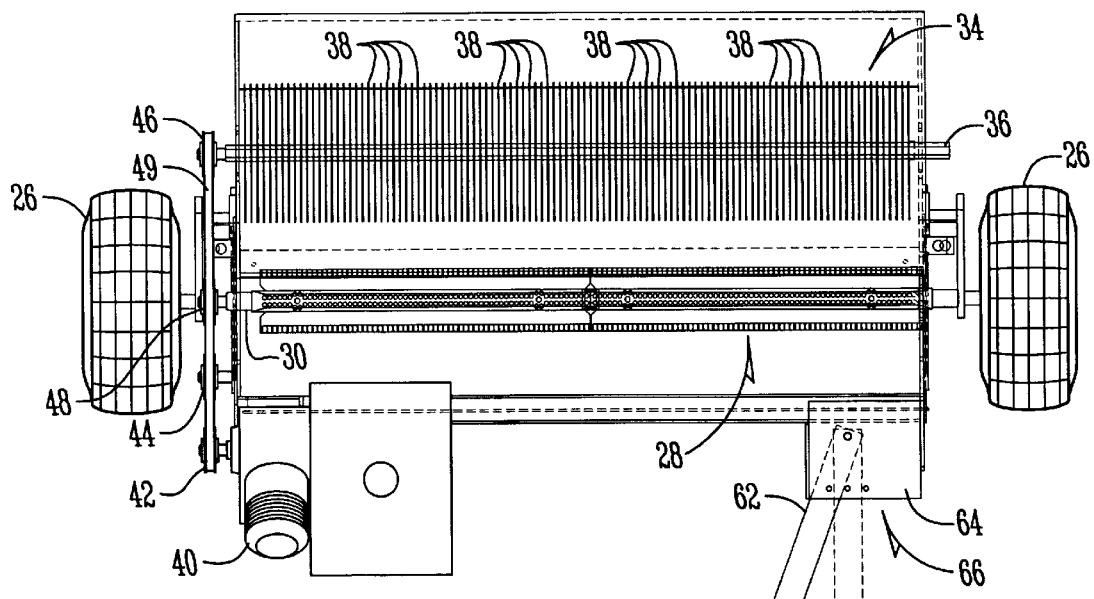
FIG. 2 is a top view of the core processor.

Referring to the Figures, the core processor of this invention is generally referred to by reference numeral 10. The core processor 10 has a housing 12 with a forward end 14, a rearward end 16, opposed sidewalls 18, 20, a top 22, and an open bottom 24. While the housing can be formed in any shape or configuration, it is preferred that sidewalls 18, 20 be spaced at least forty-eight inches apart from one another as a wider separation may be less effective in picking up cores on undulating surfaces and a narrower width limits productivity. Also preferred is a top 22 that is hingedly connected to a top edge 14 A of the forward end 14 to provide access to the internal working parts of the core processor 10.

Operatively connected to the housing 12 are a pair of wheels 26 for operation and transporting the core processor 10. The wheels 26 have a conventional axle or stub axle and bearing arrangement for rotation.

Extending longitudinally through the sidewalls 18, 20 is a rotatable brush member 28. While many different configurations are contemplated for the brush member 28, one example includes a brush shaft 30 upon which brush bristles 32 are fixed. While bristles are described in this example, other non-turf scalping materials can be used such as rubber blades or cylinders. The firmness of the bristles depends upon the thickness of the cylinder, as well as the rpm of the brush member 28 and the ground speed of the processor 10 during operation. It is preferred that the bristles be about four to five inches in length and made of polypropylene or similar material that does not absorb moisture and resists wear. The brush member 28 can be positioned so that the bristles 32 may come in contact with the ground. For the purpose of this invention, ground is defined to mean either the dirt surface or grass that extends above the dirt surface. The amount of gap or overlap with the ground and the bristles 32 depends on the ground contour, type of turf, and turf condition. It is preferred that the bristles 32 overlap the ground by no more than 1" to prevent surface (turf) damage.

Figure 4:
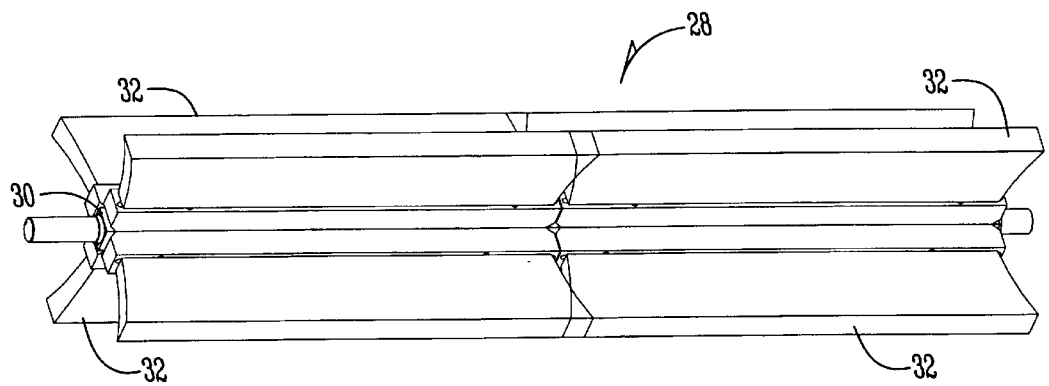
FIG. 4 is a perspective view of a brush member.
Figure 5:
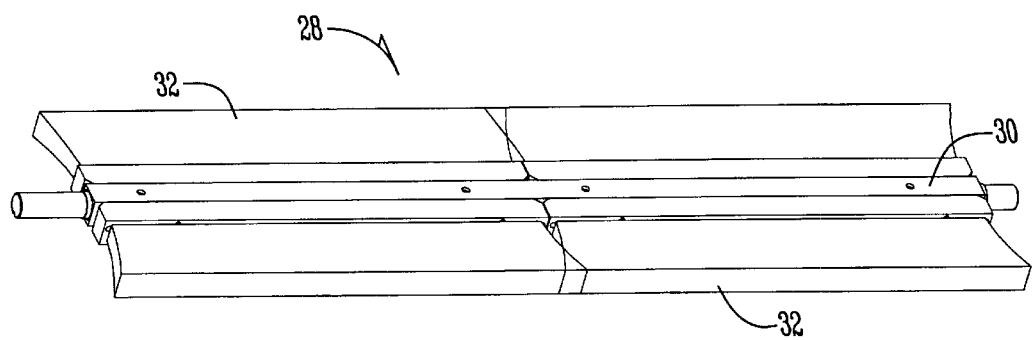
FIG. 5 is a perspective view of a brush member.

The bristles 32 are not necessarily fixed all the way around the brush shaft 30. Rather, the bristles 32 are fixed to the shaft 30 in spaced relation to allow an area where cores are gathered and picked up by the bristles 32. While the bristles 32 can be fixed at any angle and all the way around the brush shaft, in one embodiment they are separated into four sections fixed at a 180° angle forming two bristle lines as shown in FIG. 5, or separated into eight sections at a 90° angle forming four bristle lines as shown in FIG. 4. The sections can also be offset in relation to one another.

In the preferred embodiment, the centerline axis of the brush member 28 is aligned with or near the rotational axis of the wheels 26 to prevent or eliminate front-to-back bridging between the wheels 26 and the brush member 28. Bridging causes contoured areas of the ground to be missed leaving cores untouched or excess brush overlap causing possible turf damage.

In operation, it is preferred that the brush member 28 rotates in a direction such that the bristles contact the ground in a direction toward the front end 14 of the housing 12. The brush member 28 can also be set to rotate in the opposite direction in an alternative embodiment. While the rotation of the brush member 28 can be operated at different speeds and depends on the condition of the turf and ground speed of the processor 10, it is preferred that the brush member operate at about 600 to 1000 rpm's. As the brush member 28 rotates, it gathers the cores in the spaced area defined by the bristles 32 and transports the cores up into the housing and back into a shredding member 34. In one embodiment, to assist the brush member 28 in gathering and transporting cores up into the housing 12, a gathering flap 33 can be used. The gathering flap is connected to the lower edge 14B of the front end 14 of the housing 12 and extends down contacting the ground. In operation, as the core processor 10 moves forward, the flap 33 slants in a rearward direction that creates a means to guide the cores up into the housing.

By using a brush member 28 to pick up the cores and throw them into the shredding member 34, one can avoid scalping or other damage to the turf during the shredding process. Particularly, use of the brush member 28 avoids damage to the turf caused by dragging a mat across the cores to break them apart.

Figure 6:
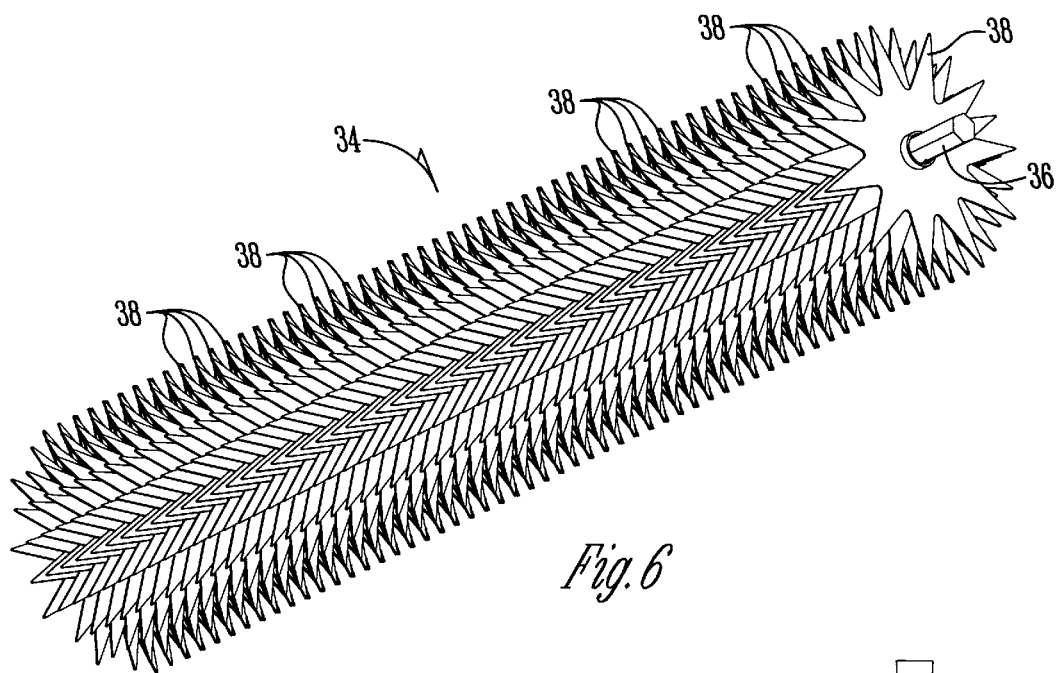
FIG. 6 is a perspective view of a shredding member.

The shredding member 34 can be of many configurations, however, as one example the shredding member has a shredding shaft 36 that extends longitudinally through the sidewalls 18, 20 of the housing 12 (See FIG. 6). Surrounding the shaft 36 are a plurality of blades 38 that extend either perpendicular, transverse, or helical to the shaft 36. The blades 38 can be formed in any shape and be made of any material capable of shredding cores such as hi-carbon steel and it is preferred that the blades be staggered as shown in FIG. 6. The shredding member 34 can process all types of cores regardless of soil type or condition.

The shredding member 34 is positioned above and predominantly but not completely behind the brush member 28 such that cores are thrown onto the blade surface of the shredding member 34 from the brush member 28 where the blades pulverize and shred the cores removing the soil part of the core from the thatch. Cores that miss going directly into the shredding member 34 are deflected off surfaces of the housing and directed back into the shredding member 34. The shredding member 34 is positioned so that the brush member 28 throws cores onto the blade surface at or above a horizontal plane that passes through the rotational axis of the shredding member 34. The shredding member 34 can pulverize cores rotating in either direction but in this embodiment rotates in the same direction as the brush member 28 which is toward the front end 14 and up toward the top 22 of the housing. While the shredding member 34 can operate at any speed capable of shredding the cores, it is preferred that it rotate at about 2000 rpm's. Thus, when the cores are thrown onto the blade surface of the shredding member 34 from the brush member 28, the blades 38 pulverize and shred the cores so the soil of the core is removed from the thatch and transported by the shredding member 34 and deposited on the ground through the open bottom 24 of the housing 12. Thus, the shredding member 34 can quickly pulverize the cores returning valuable soil to the turf making the shattered cores a more usable product.

Figure 3:
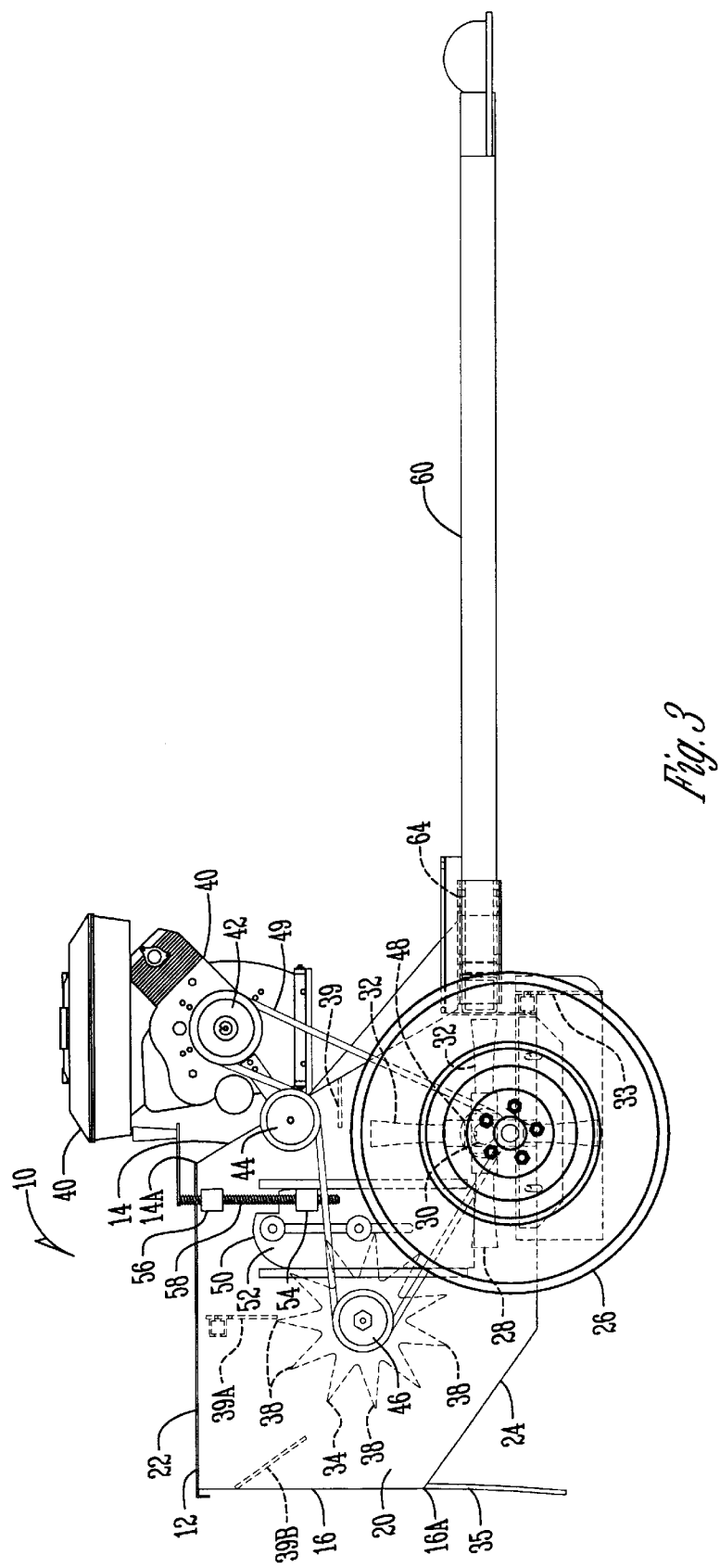
FIG. 3 is a side view of the core processor.

In one embodiment, a containing flap 39 is connected to the front end 14 of the housing 12 and extends over the brush member 28 (FIG. 3). The containing flap 39 prevents the escape of cores before they are shattered by containing the cores and providing re-contact of the cores with the blade surface of the shredding member 34.

In another embodiment, a containing flap 39A is connected to the sidewalls and extends across and above the shredding member 34 to prevent the escape of cores and allow recontact. An additional containing flap 39B can be used in conjunction with flap 39A or by itself to serve the same purpose. Flap 39B is connected to the rearward end 16 and extends diagonally in a downward direction.

Also, in one embodiment, a depositing flap 35 is connected to a lower edge 16 A of the rearward end 16 of the housing 12 and extends downwardly contacting the ground (FIG. 3). The depositing flap 35 causes the soil from the shattered cores to filter out of the processor 10 more evenly on the ground.

A power means 40 is drivingly connected to both the brush member 28 and the shredding member 34 for rotating both. The power means 40 can be any power source including a gas engine, electric motor, PTO, or hydraulic source. One example, as shown in the figures, includes a 12 horse power gas engine with a gear box connected to the front end 14 of the housing 12. A drive pulley 42 is operatively connected to the drive shaft of the engine. An idler pulley 44 is rotatably attached to sidewall 18 of the housing 12. In an alternative embodiment, the idler pulley 44 is rotatably attached to a bar 45 extending from the power means 40. Likewise, a shredding pulley 46 is operatively connected to the shredding member 34 in any conventional manner and a brush pulley 48 is operatively connected to the brush member 28 in any conventional manner. A belt 49 tightly surrounds the drive pulley 42, the shredding pulley 46 and the brush pulley 48. The size of the pulleys along with the position of the idler pulley 44, which operatively communicates with the belt 49 controls the rotational speed of both the brush member 28 and the shredding member 34. A chain and sprocket system may also be used in place of the belt and pulleys as the driving mechanism from the power source(s). In this embodiment, because the processor 10 is powered by its own engine, small, lightweight vehicles can be used to transport the processor thus reducing turf compaction and freeing larger vehicles, some with PTO capabilities, for other jobs.

Operatively connected to the sidewalls 18, 20 of the housing 12 is an adjustment means 50 for raising and lowering the housing 12 in relation to the wheels 26. While many configurations can be used to accomplish this function, one example includes an adjustment plate 52 that is slideably mounted to the sidewalls 18, 20 at one end and fixably connected to the wheels 26 at the opposite end (See FIG. 7). Mounted on the adjustment plate 52 is a threaded pillow block 54. Mounted on the sidewalls 18, 20 and above the pillow block are adjusting blocks 56 that have a bore there through that receives a screw 58. The screw 58 extends through the adjusting block 56 and threadably engages the pillow block 54. To raise the housing 12 in relation to the wheels 26, one rotates the screw 58 so that it extends further through the pillow block 54. To lower the housing 12 in relation to the wheels 26, one rotates the screw 58 so that it is retracted back through the bore of the pillow block 54. The lock nut 55 maintains the position of the screw 58 within the adjusting block 56 when raised and lowered. Because the brush member 28 extends through the sidewalls 18, 20 of the housing 12, raising and lowering the housing 12 in relation to the wheels 26 also raises and lowers the brush member 28 in relation to the ground for use with different types and conditions in turf.

Figure 7:
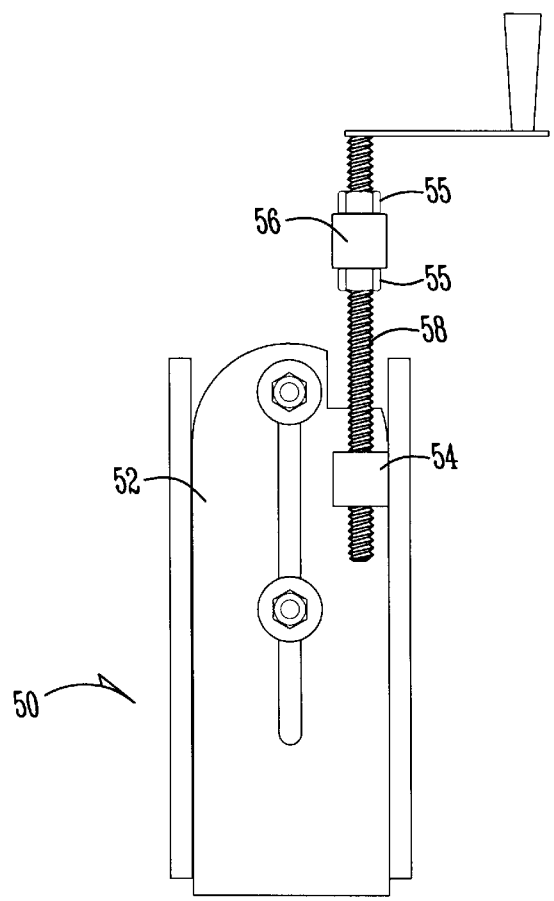
FIG. 7 is a side view of an adjusting means.

While the processor 10 can be adapted for use as a walk behind device, 3 pt. tractor mount, or an out front mower, it also can be adapted with a conventional hitch 60 mounted on the front end 14 of the housing 12 for connection to a transporting vehicle. In an alternative embodiment, as shown in FIG. 7, the hitch 60 can be diagonally positioned and maintained to swing out from the housing 12 so that the processor does not directly follow behind the transporting vehicle. This is accomplished by aligning the hitch 60 with diagonal holes 62 in a mounting plate 64 and locking the hitch in place with pins or screws 66 that extend through the hitch 60 and the holes 62. This allows one to drive over an area that is free of cores while the core processor 10, which follows off to one side, goes over an area covered with cores picking them up, shredding them, and re-depositing the soil to the ground. This feature is particularly beneficial when cores are dry as driving over the cores with even a light-weight vehicle can cause the cores to sink into the ground.

The embodiments of the present invention described above are deemed in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A core processing apparatus, comprising:
   a housing having forward and rearward ends, opposite sidewalls, a top, and an open bottom;
   wheels operatively connected to said housing for transporting said housing;
   a rotatable brush member that extends longitudinally through said sidewalls of said housing and is positioned to engage the ground through said open bottom for picking up and transporting cores;
   a rotatable shredding member that extends longitudinally through said sidewalls and is positioned to receive said cores on a surface of the shredding member from said brush member for shattering the cores and depositing the shattered cores on the ground through said open bottom; and
   a power means drivingly connected to the brush member and the shredding member.

2. The apparatus of claim 1 wherein a center axis of the brush member is substantially aligned with a rotational axis of the wheels.

3. The apparatus of claim 1 wherein an adjustment means is operatively connected to the sidewalls and the wheels for raising and lowering the housing in relation to the wheels.

4. The apparatus of claim 1 wherein a hitch is operatively connected to the forward end of the housing for connection with a transporting vehicle.

5. The apparatus of claim 4 wherein the hitch is operatively connected to the forward end of the housing in a substantially diagonal position.

6. The apparatus of claim 1 wherein a flap is connected to the forward end of the housing and extends outwardly over the brush member.

7. The apparatus of claim 1 wherein a substantially vertical flap is connected to the sidewalls of the housing and extends across and above a longitudinal axis of the shredding member.

8. The apparatus of claim 1 wherein a flap is connected to the rearward end and extends diagonally in a downward direction.

9. The apparatus of claim 7 wherein a flap is connected to the rearward end and extends diagonally in a downward direction.

10. The apparatus of claim 1 wherein the shredding member is positioned above and partially rearward of the brush member such that the cores are thrown by the brush member onto the shredding member above a horizontal plane passing through a rotational axis of the shredding member.

11. The apparatus of claim 1 wherein the housing has a flap connected to a lower edge of the forward end for guiding the cores transported by the brush member.

12. The apparatus of claim 1 wherein the housing has a rearward flap connected to a lower edge of the rearward end for depositing said shattered cores substantially evenly on the ground.

13. A core processing apparatus, comprising:
    a housing having forward and rearward ends, opposite sidewalls, a top, and an open bottom;
    wheels operatively connected to said housing for transporting said housing;
    a rotational brush member that extends longitudinally through said sidewalls of said housing and is positioned to engage the ground through said open bottom for picking up and transporting cores;
    a rotational shredding member that extends longitudinally through said sidewalls and is positioned to receive said cores on a surface of the shredding member from said brush member for shattering the cores and depositing the shattered cores on the ground through said open bottom;
    a power means drivingly connected to the brush member and the shredding member; and
    an adjustment means that is operatively connected to the sidewall and the wheels for raising and lowering the housing in relation to the wheels.

14. The apparatus of claim 13 wherein a center axis of the brush member is substantially aligned with a rotational axis of the wheels.

15. The apparatus of claim 13 wherein a hitch is operatively connected to the forward end of the housing for connection with a transporting vehicle.

16. The apparatus of claim 15 wherein the hitch is operatively connected to the forward end of the housing in a substantially diagonal position.

17. The apparatus of claim 13 wherein a flap is connected to the forward end of the housing and extends outwardly over the brush member.

18. The apparatus of claim 13 wherein a substantially vertical flap is connected to the sidewalls of the housing and extends across and above a longitudinal axis of the shredding member.

19. The apparatus of claim 13 wherein a flap is connected to the rearward end and extends diagonally in a downward direction.

20. The apparatus of claim 18 wherein a flap is connected to the rearward end and extends diagonally in a downward direction.

21. The apparatus of claim 13 wherein the shredding member is positioned above and partially rearward of the brush member such that the cores are thrown by the brush member onto the shredding member above a horizontal plane passing through a rotational axis of the shredding member.

22. The apparatus of claim 13 wherein the housing has a flap connected to a lower edge of the forward end for guiding the cores transported by the brush member.

23. The apparatus of claim 13 wherein the housing has a rearward flap connected to a lower edge of the rearward end for depositing said shattered cores substantially evenly on the ground.

24. A core processing apparatus, comprising:

a housing having forward and rearward ends, opposite sidewalls, a top, and an open bottom;

wheels operatively connected to said housing for transporting said housing;

a rotatable brush member that extends longitudinally through said sidewalls of said housing and is positioned to engage the ground through said open bottom for picking up and transporting cores, said brush member having a center axis that is substantially aligned with a rotational axis of the wheels;

a rotatable shredding member that extends longitudinally through said sidewalls and is positioned above and partially rearward of the brush member such that the cores are thrown by the brush member onto the shredding member above a horizontal plane passing through a rotational axis of the shredding member for shattering cores and depositing the shattered cores on the ground through said open bottom;

an adjustment means that is operatively connected to the sidewalls and the wheels for raising and lowering the housing and the wheels in relation to the wheels; and a power means drivingly connected to the brush member and the shredding member.

* * * * *